Feb. 6, 1934.    T. L. MORRIS ET AL    1,946,097
GATE TYPE ROTARY PUMP
Filed Aug. 17, 1931    3 Sheets-Sheet 2
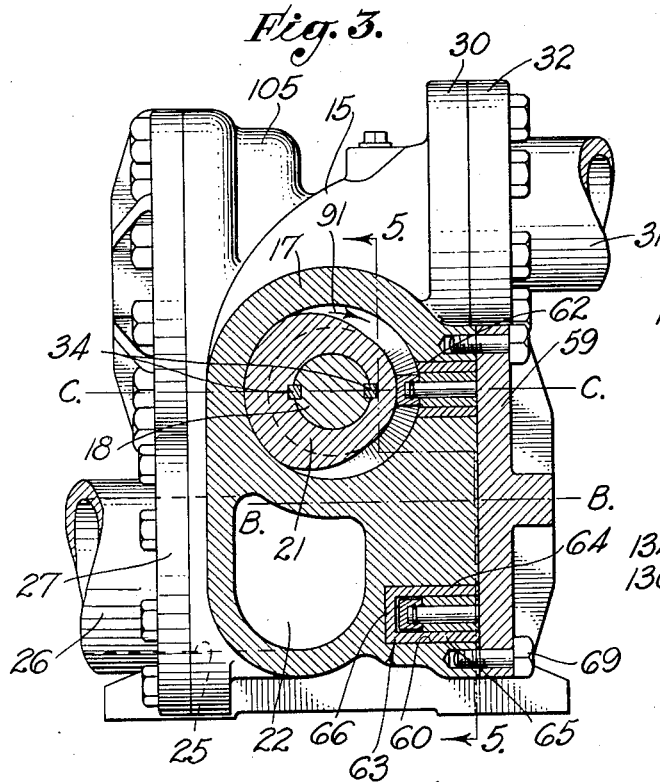
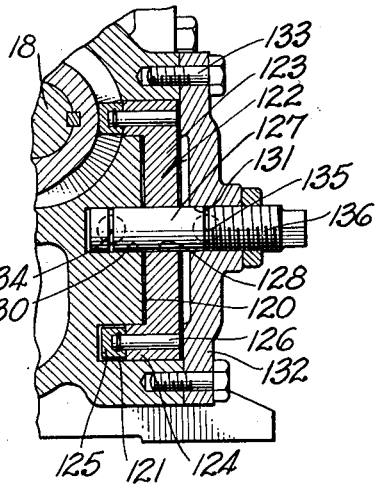
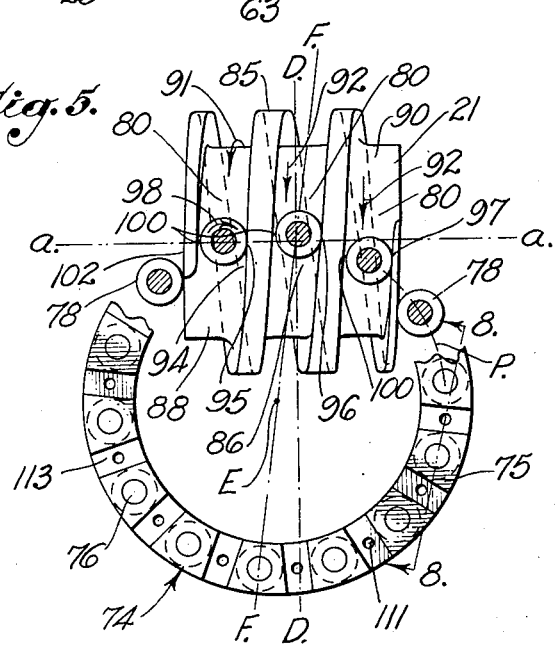
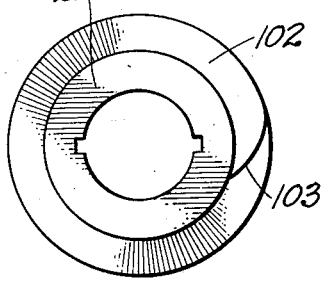
INVENTORS:
Thomas L. Morris,
William A. Grant,
BY
Fad W Lewis
ATTORNEY.

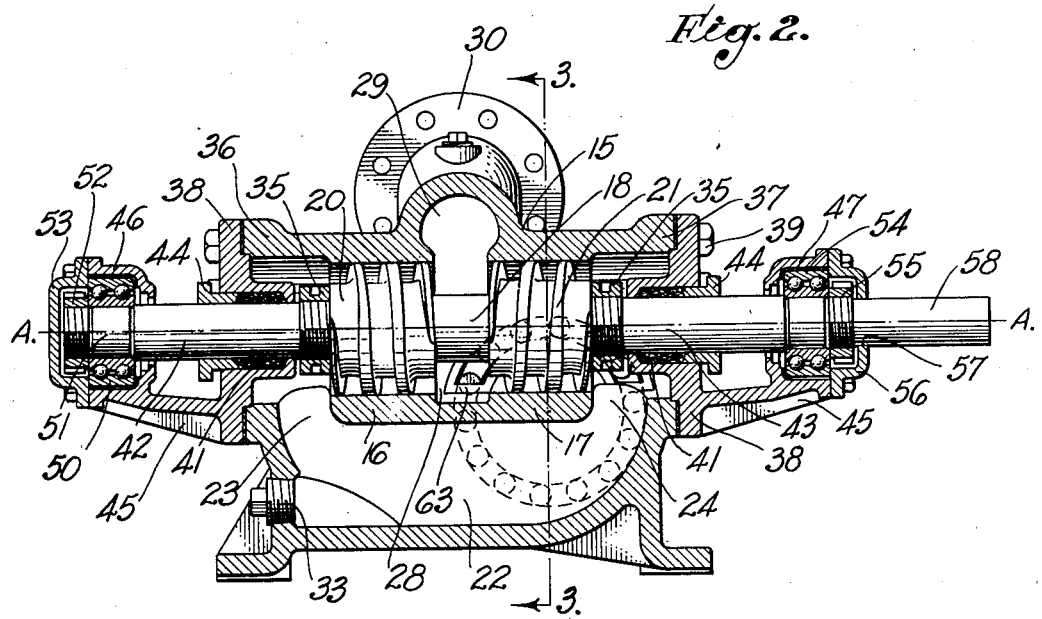
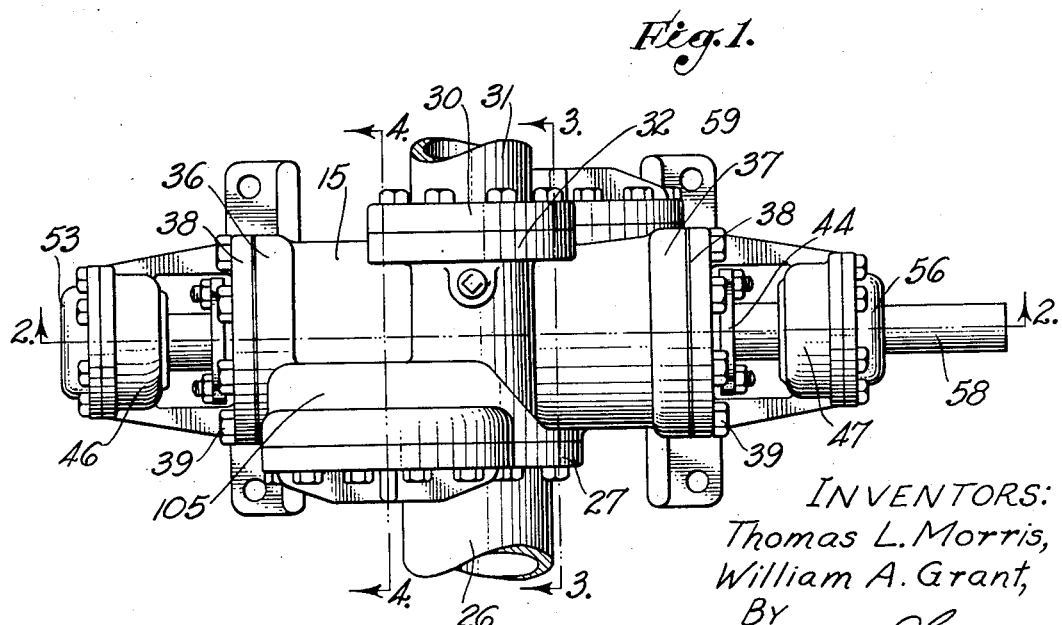

Feb. 6, 1934.  T. L. MORRIS ET AL  1,946,097
GATE TYPE ROTARY PUMP
Filed Aug. 17, 1931  3 Sheets-Sheet 3
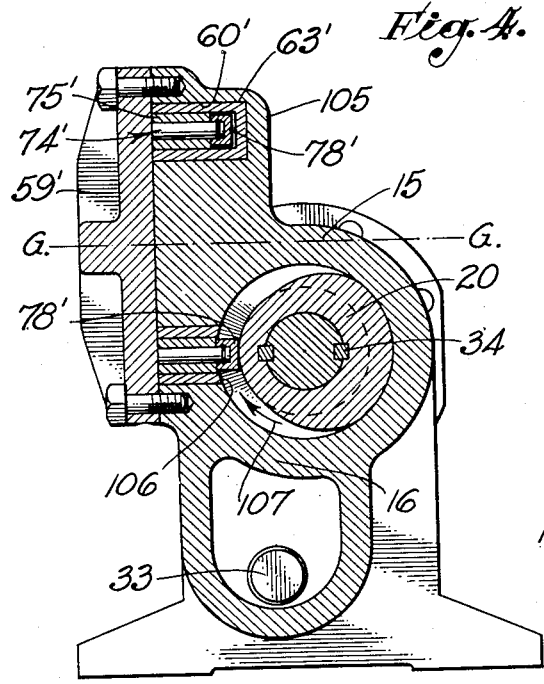
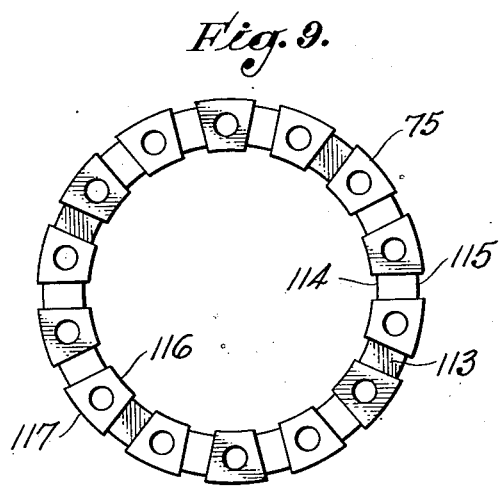
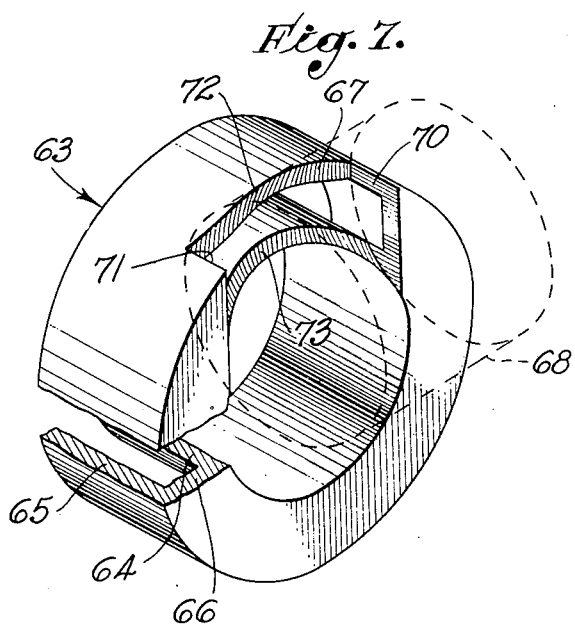
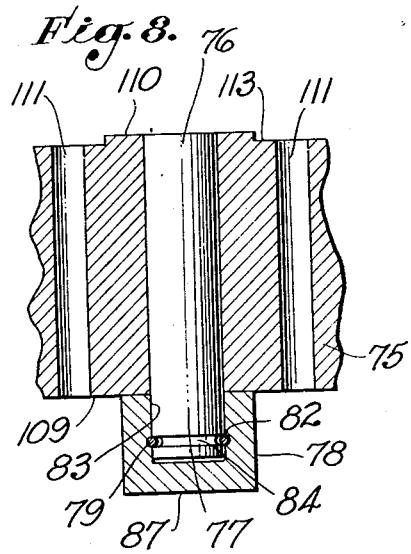
INVENTORS:
Thomas L. Morris,
William A. Grant,
BY
ATTORNEY.

Patented Feb. 6, 1934

1,946,097

UNITED STATES PATENT OFFICE 1,946,097

GATE TYPE ROTARY PUMP

Thomas L. Morris, Van Nuys, and William A. Grant, Los Angeles, Calif., assignors to Grademor Corporation, Ltd., Los Angeles, Calif., a corporation of California Application August 17, 1931. Serial No. 557,460

6 Claims. (Cl. 103—125)

Our invention relates to pumps in which a fluid is pumped by means of a screw turning within a casing and obstructions or gate means moving along said screw longitudinally in engagement with the grooves thereof to prevent the fluid from rotating with the screw and causing the fluid to travel longitudinally from one end of the screw to the other. We are aware that pumps of this character have been made and that they have not proved efficient or satisfactory for the reason that each of the pumps of this character found in the prior art is deficient in one or more essential features.

It is an object of our invention to provide a screw pump of positive displacement character having very high efficiency due to the small friction loss and minimized slippage to be found therein as the result of the combination of elements which we have produced.

It is a further object of the invention to provide a pump in which high efficiency may be maintained for a relatively long period of time, this being accomplished by the use of gate members consisting of parts which roll while in engagement with the grooves of the pump screw.

It is a further object of the invention to provide a screw pump of the above character having a rotary gate structure of simple form and of such character that it will operate under a condition of balanced pressures.

It is a further object of the invention to provide a screw pump of counterflow type in which a pair of separate gate structures are employed, one gate structure for each screw, and so positioned that the screws rotate toward the gate members, which in turn are so positioned relative to the screws that the fluid pressure against the gate members imparts to them a rotative force acting in direction so that vibration of the gate members is thereby avoided.

A further object of the invention is to provide a pump of this character having new and novel features in the construction of its various parts for keeping vibration at a minimum.

Further objects and advantages of the invention will be made evident throughout the following part of the specification.

Referring to the drawings, which are for illustrative purposes only,

Fig. 1 is a plan view of a preferred embodiment of our invention.

Fig. 2 is a section on a plane represented by the line 2—2 of Fig. 1.

Fig. 3 is an enlarged cross section on a plane represented by the lines 3—3 of Figs. 1 and 2.

Fig. 4 is an enlarged cross section on a plane represented by the line 4—4 of Fig. 1.

Fig. 5 is an elevational view taken substantially as indicated by the line 5—5 of Fig. 3, showing a propeller screw and a gate structure cooperating therewith.

Fig. 6 is a view of the left end of the screw shown in Fig. 5.

Fig. 7 is a perspective elevational view of a replaceable track member which provides a groove in which a gate structure operates.

Fig. 8 is an enlarged fragmentary sectional view on a plane represented by the line 8—8 of Fig. 5.

Fig. 9 is an elevation of a ring member of a gate structure having flow-obstructing and pressure-balancing depressions therein.

Fig. 10 is a fragmentary section showing an alternative form of gate structure which may be employed in the practice of the invention.

In the preferred form of our invention shown in Figs. 1 and 2, we employ a casing 15 which is preferably cast en bloc. This casing 15 has cylinders or cylindrical barrels 16 and 17 which, for the matter of reference, may be referred to as right and left barrels and are axially aligned so that a shaft 18 extended therethrough may carry left-hand and right-hand screws 20 and 21 in concentric positions within the barrels 16 and 17. Below the barrels 16 and 17 is an inlet passage 22 having upwardly turned ends 23 and 24 which communicate respectively with the intake ends of the barrels 16 and 17. The inlet passage 22 is provided with an inlet opening 25 in the side wall thereof, and an inlet pipe 26 may be secured thereto by means of a flange 27. Between the inner ends of the barrels 16 and 17 is a space 28 which connects to an outlet passage 29, there being a flange 30 at the outer end of the outlet passage to which a discharge pipe 31 may be secured by means of a flange 32. One end of the inlet passage 22 is provided with a drain plug 33.

The shaft 18 may have the scews 20 and 21 integrally formed thereon, or the screws 20 and 21 may be made separately and secured in place in any known manner, such as by the use of keys 34 and lock nuts 35. The ends of the casing 15 consist of cylindrical walls 36 and 37 aligned with the barrels 16 and 17 and of larger internal diameter than the barrels so that the shaft 18 with the screws 20 and 21 thereon may be readily moved into place. After the shaft assembly is installed, end plates 38 are secured in position by means of bolts 39, these end plates being provided with packing boxes 41 surrounding the parts 42 and 43 of the shaft 18, there being glands 44 for compressing the packing. By means of bracket arms 45, which may be cast integrally with the end plates 38, outboard bearing housings 46 and 47 are secured in axial alignment with the barrels 16 and 17. The housing 46 contains a combination radial-thrust ball bearing 50 which is secured on the leftward extremity 51 of the shaft 18 by means of a locking nut 52, and the leftward end of the housing 46 is closed by means of a cap 53. The housing 47 contains a combination radial-thrust bearing 54 which is secured to the shaft 18 by means of a locking nut 55, and the housing 47 is closed by means of a cap member 56 having an opening 57 through which a shaft extension 58 projects for engagement by a driving means which may be an electric motor or other power source.

As shown in Fig. 3, the shell 15 has an annular channel or gate structure recess 60 formed in a position to cooperate with the barrel 17 and having an external cover plate 59 secured in place by screws 69. The channel 60 is so formed that the axis B—B thereof lies in a vertical plane which intersects the axis A—A of the shaft 18 and the screws 20 and 21, and the axis B—B is disposed at such distance from the axis A—A that one portion, such as the upper portion, of the channel 60 will lie in a horizontal plane C—C which passes through the axis A—A. The upper portion of the channel 60 opens into the barrel 17 and forms an intercommunicating opening 62 at one side of the barrel 17.

In the groove 60 a replaceable annular track member 63 is placed, this track member having, as shown in Figs. 3, 4, and 7, inner and outer cylindrical walls 64 and 65 connected together at their inner ends by an annular wall 66 which rests at the inner end of the groove 60. In the upper portion of the track member 63 an opening 67 is formed preferably by use of a cylindrical milling cutter, such as indicated by dotted lines 68 in Fig. 7, this mill having external dimensions the same as the screw 21 so that an opening will be formed which will agree with and closely adhere to the contour of the engaged portion of the screw 21. The vertical end walls 70 and 71 at the ends of the opening 67 lie adjacent the ends of the screw 21 when the track member 63 is in place in the channel 60 so as to form guards for the hereinafter set forth gate members 78 as they enter and leave the screw 21, and the cylindrically curved walls 72 and 73 lie adjacent the outer cylindrical wall of the screw 21, the function of the walls 72 and 73 being to guard the gate rollers from fluid pressure as they pass from the ends of the screws into the annular recess 60 and to make the channel formed between the walls 64 and 65 of the track member 63 of maximum length so that leakage through the track member will be maintained at a minimum. In the track member 63 is a gate structure 74 consisting of a cylindrical ring 75 having a plurality of stub shafts or pins 76 secured therein in evenly spaced relationship and with their axes extending parallel to the axis B—B. The projecting ends 77 of the pins 76 extend toward the screw 21, and roller gate members 78 are secured thereon in position to engage the grooves or channels 80 of the screw 21. As shown in Fig. 8, the roller gate members 78 are secured on the pins 76 by means of resilient retaining rings 79 which engage grooves 82 formed in the blind bores 83 of the roller gate members 78 and external grooves 84 on the pins 76, the grooves 84 being of a depth equal to or slightly greater than the diameter of the wire from which the spring rings 79 are made so that such springs may be collapsed into the grooves 84 during the placing and removal of the roller gate members 78.

As best shown in Fig. 5, which presents an elevation of the screw 21 and a back view of the ring 75, a portion of the ring is cut away where it passes in front of the screw 21 so that the manner of engagement of the gate members 78 with the grooves 80 may be shown. In the preferred embodiment of the invention the grooves 80 each consist of one spiral or one turn around the body of the screw 21, and the grooves 80 join in end-to-end relationship to form a continuous single-cut groove in the face of the screw. Fourteen gate members 78 are employed in the gate structure 74, with the result that for each rotation of the screw 21 the gate structure advances one gate member. The screw 21 is cut or milled to cooperate perfectly with the gate members 78, this cooperation being understood from the following description of the method of cutting the screw 21. An end mill of substantially the same size as one of the gate rollers 78 is mounted so as to move through a circular path P, and a screw blank in the position of the screw 21 is caused to rotate on an axis $a$—$a$ at a proportionate speed determined by the ratio of the screw 21 to the number of gate members 78, which in this instance is 1 to 14. The grooves 80, or the single continuous groove formed thereby, is the path cut by the moving milling cutter, and therefore the side and bottom walls of the grooves 80 are so positioned that they will closely fit the roller gate members 78 as such roller gate members move in longitudinal engagement with the screw 21. In order to provide a proper condition of operation, a minute clearance is provided between the gate members 78 and the bottom and side walls of the grooves 80. Every part of the continuous groove formed on the screw is of the same width, and the thread or spiral wall 85 of the screw 21 decreases in thickness from the center thereof toward its ends, as shown in Fig. 5. The center portion 86 of the continuous groove is substantially flat and engages the flat end faces 87 of the gate members 78 as they pass therethrough, but the extreme ends 88 and 90 of the continuous groove are concave for the reason that they engage the upper curved edges formed between the cylindrical faces and the flat end faces of the gate members 78. Extending through the center of the screw 21 is a vertical plane D—D. It will be noted that the axis of the gate structure indicated by the point E lies to the rear of the plane D—D and is positioned on a line F—F which slopes at an angle corresponding to the angle of lead of the central portion of the screw 21.

In the operation of the pump the screw 21 rotates in clockwise direction or as indicated by arrows 91 in Figs. 3 and 5, causing oil to be trapped in the end 88 of the continuous groove of the screw and to be carried through the groove and discharged from the rearward end 90 of the groove. The fluid in the groove is prevented from rotating with the screw by the gate members 78 which are in engagement with the groove. The pressure of the fluid is downwardly against the rollers, as indicated by arrows 92 in Fig. 5, and as the center of the gate structure is rearwardly offset, the force against the gate members 78 in engagement with the screw causes the gate structure to rotate in clockwise direction so that the rollers 78 during their engagement with the screw will be held in rolling engagement with the rearward face 94 of the thread or spiralled wall 85, as indicated at 95, 96, and 97. Therefore, the rollers 78 continuously rotate as indicated by arrows 98 during their engagement with the screw 21. While out of engagement with the screw 21, the rollers 78 do not rotate. From the foregoing description it will be perceived that the rollers 78 make a tight seal with one face of the spiral thread 85 due to rolling engagement therewith. Leakage past the other side of each roller through the small spaces 100 is resisted by the forward movement of the portions of the rollers adjacent the spaces 100 as the rollers rotate in clockwise direction.

As previously mentioned, the continuous groove of the screw 21 is slightly over two complete turns, with the result that at no time are there less than two gate members 78 in complete engagement. This is an important difference over the prior art in which a screw having a single turn is employed, with the result that part of the time the fluid pressure is against an entering gate member and then transfers to a gate member which is leaving the screw and consequently causes the gate member to vibrate back and forth in the screw during the opreation of the pump. Our new construction avoids this vibration and also practically eliminates wear on the gate members 78 for the reason that the gate members travel through the screw 21 with a rolling action instead of a frictional or sliding engagement.

As shown in Fig. 6, the front end 102 of the spiralled wall 85 is gradually decreased in height by the use of a non-radial or sloping end wall 103, thereby eliminating vibration as the end 102 approaches a gate member 78 and traps a body of oil in the end 94 of the continuous groove.

As shown in Figs. 1 and 4, the casing 15 includes an upwardly extending wall 105 in which an annular channel 60' is formed on an axis G—G lying in a vertical plane which intersects the barrel 16 and is disposed at such distance above the axis of the barrel 16 that the lower portion of the channel cuts into the barrel 16 and communicates therewith through an intercommunicating opening 106 similar in character to the opening 62 of Fig. 3. In the channel 60' is a track member 63' similar in all respects to the track member 63 shown in Figs. 1, 3, 5, and 7, and held in the track member 63' by a cover plate 59' is a gate structure 74' having a plurality of roller gate members 78' mounted thereon in position to engage the screw 20, which is mounted on the shaft 18 in such position relative to the screw 20 that the end thrust exerted thereon during the pumping action will balance the end thrust operating against the screw 20 so that during operation of the pump there is substantially no thrust load placed on either of the bearings 50 or 54. It is to be noted that the gate structure 74' is rearwardly offset relative to the center of the screw 20 and that the fluid pressure against the gate members 78' is in the direction of an arrow 107 of Fig. 4 so that the same conditions of operation are obtained in the gate structures 74 and 74'.

The fluid pressure adjacent the front and rear faces 109 and 110 of the rings 75 and 75' of the respective gate structures 74 and 74' is balanced by use of openings 111 which extend through the rings in directions parallel to the axis D—D so that the fluid pressures may equalize through these openings 111 as the rings move through their respective track members. As shown in Figs. 5 and 8, small depressions 113 are formed across the rearward face 110 of each ring 75 or 75' for accumulation of small sealing bodies of fluid.

In Fig. 9 we show a ring 75 or 75' having openings or slots 114 and 115 cut across the inner and outer cylindrical faces 116 and 117 thereof so as to provide means for equalizing the pressures between the faces 110 and 109 of the rings and also forming fluid pockets which act as barriers in resisting the flow of fluid through the spaces between the rings 75 and 75' and the track members in which they operate.

In Fig. 10 we show a gate recess 120 having an annular groove 121 extending peripherally therearound. In this recess 120 is a gate structure 122 comprising a disc 123 having a flange 124 projecting into the outer portion of the groove 121, and a plurality of gate members 125 supported on pins 126 supported in the peripheral portion of the disc 123. The gate structure rotates on a shaft 127 which is pressed into an opening 128 in the disc 123, and the ends of which project into journals 130 and 131 formed respectively in the bottom wall of the recess 120 and a cover plate 132 which is secured in position over the recess 120 by screws 133. The inner end of the shaft 127 seats against a ball bearing 134, and a ball bearing 135 is adjusted into engagement with the outer end of the shaft 127 by means of an adjustment screw 136, thereby making it possible to hold the gate structure 122 in proper working relationship.

Although we have herein shown and described our invention in simple and practical form, it is recognized that certain parts or elements thereof are representative of other parts, elements, or mechanisms which may be employed in substantially the same manner to accomplish the same results; therefore, it is to be understood that the invention is not to be limited to the details disclosed herein but is to be accorded the full scope of the following claims.

We claim as our invention:

1. A pump of the character described, including: a body having a barrel on a primary axis, and a gate structure recess communicating with a side of said barrel; a screw member in said barrel having spiral grooves in the peripheral wall thereof; a gate structure mounted in said recess so as to rotate on an axis lying in a plane intersecting said primary axis, said gate structure having a plurality of gate rollers projecting therefrom in positions to travel longitudinally through said grooves of said screw member and to rotate on axes substantially radial to said primary axis during the time said rollers are in said grooves, said axis of said gate structure being set to one side of a plane passing through the effective center of said screw member and perpendicular to the axis thereof, so that fluid pressure against the rollers in engagement with said screw member will apply a constant rotational force to said gate structure; and means for rotating said screw member.

2. A pump as defined in claim 1 in which said axis of said gate structure is set rearwardly of a plane passing through the effective center of said screw member and perpendicular to the axis thereof, so that fluid pressure against the rollers in engagement with said screw member will apply a constant rotational force to said gate structure.

3. A pump of the character described, including: a casing forming a barrel on a primary axis; walls forming an annular channel, a portion of said channel being in open communication with one side of said barrel; a screw member in said barrel having spiralled grooves in the periphery thereof; a gate structure in said annular channel, said gate structure comprising a ring having a plurality of gate members projecting therefrom in position to engage said grooves in said screw member, said ring having openings extending from the front to the back thereof for equalizing fluid pressure in the spaces within said annular channel adjacent the front and back of said ring and having notches in the face thereof opposite to said gate members, said gate members being of a size to close said grooves while in engagement therewith; and means for rotating said screw member.

4. A pump of the character described, including: a body having a barrel on a primary axis, and a gate structure recess communicating with a side of said barrel; a screw member in said barrel having spiral grooves in the peripheral wall thereof; a gate structure mounted in said recess so as to rotate on an axis lying in a plane intersecting said primary axis, said gate structure having a plurality of gate rollers projecting therefrom in positions to travel longitudinally through said grooves of said screw member and to rotate on axes substantially radial to said primary axis during the time said rollers are in said grooves, said axis of said gate structure being set to one side of a plane passing through the effective center of said screw member and perpendicular to the axis thereof so that fluid pressure against the rollers in engagement with said screw member will apply a constant rotational force to said gate structure, there being a minimum of two of said gate rollers within said grooves of said screw member at all times; and means for rotating said screw member.

5. A pump of the character described, including: a screw having a helical groove; a barrel having a bore to receive said screw and a tangential recess communicating with a side of said bore and being open to the exterior of said barrel; a cover plate for the outer end of said recess; a rotary member in said recess having a circular face disposed tangentially to the circumferential face of said screw, one side of said circular face moving longitudinally across said screw; roller gate members projecting from said circular face so as to traverse said helical groove longitudinally from one end to the other thereof; and an annular track member insertable in said recess through the outer end thereof, said track member providing a groove for said gate members and guard walls for covering said gate members as they enter and leave said groove of said screw, said guard walls having portions thereof projecting into said bore of said barrel and abutting the ends of said screw.

6. A pump of the character described, including: a screw having a helical groove; a barrel having a bore to receive said screw and a tangential recess communicating with a side of said bore and being open to the exterior of said barrel; a cover plate for the outer end of said recess; a rotary member in said recess having a circular face disposed tangentially to the circumferential face of said screw, one side of said circular face moving longitudinally across said screw; roller gate members projecting from said circular face so as to traverse said helical groove longitudinally from one end to the other thereof; and an annular track member insertable in said recess through the outer end thereof, said track member providing a groove for said gate members and guard walls for covering said gate members as they leave said groove of said screw, said guard walls having portions thereof projecting into said bore of said barrel and abutting the ends of said screw.

THOMAS L. MORRIS.
WILLIAM A. GRANT.